W. W. DINGEE.
Horse-Power.
No. 200,439.  Patented Feb. 19, 1878.
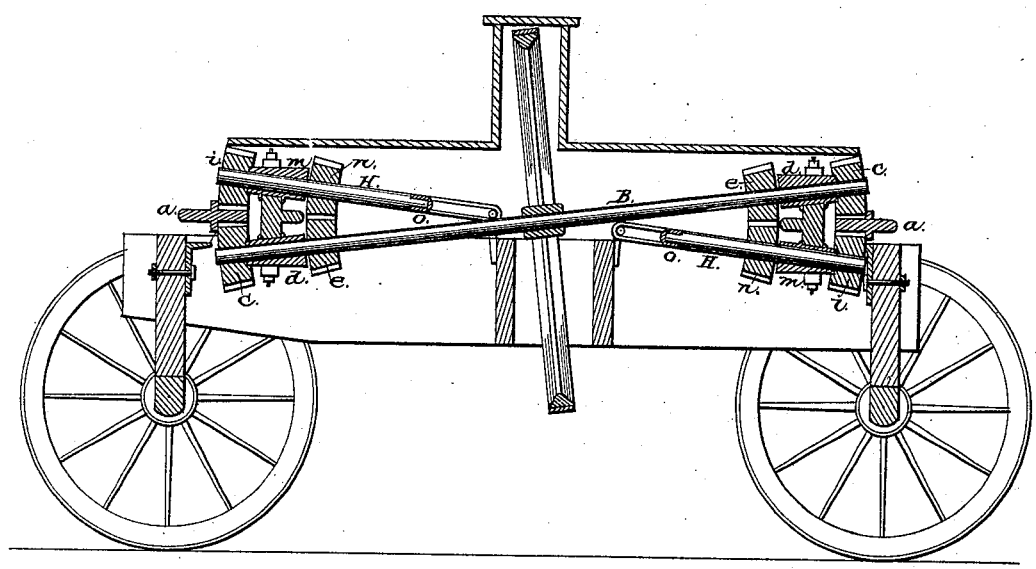
Attest:
Edgar P. Sawyer
Wm. J. Ellsworth
Inventor:
William W Dingee

UNITED STATES PATENT OFFICE.

WILLIAM W. DINGEE, OF OSHKOSH, WISCONSIN, ASSIGNOR TO THE SAWYER MANUFACTURING COMPANY, OF SAME PLACE.

IMPROVEMENT IN HORSE-POWERS.

Specification forming part of Letters Patent No. 200,439, dated February 19, 1878; application filed December 5, 1877.

*To all whom it may concern:*

Be it known that I, WILLIAM W. DINGEE, of Oshkosh, in the county of Winnebago and State of Wisconsin, have invented a new and useful Improvement in Horse-Powers, of which the following is a specification:

The object of the invention is to prevent the breakage and rapid wear of the teeth of master-wheels and pinions of horse-powers.

The drawing represents a central vertical section of the horse-power.

$a\,a$ is the master-wheel. It is a double bevel wheel, having teeth on both its upper and under faces. B is the main shaft. It has keyed on its ends pinions $c\,c$, and is so placed in the power that one of these pinions gears with teeth on upper face, the other with teeth on lower face, of master-wheel $a\,a$. $d\,d$ are boxes of main shaft B, and $e\,e$ are pinions keyed inside of boxes $d\,d$ on main shaft B. H H are two supplemental shafts, placed one above, the other below, main shaft B. They have pinions $i\,i$ keyed on their outer ends, boxes $m$ $m$, inside pinions $n\,n$, and inside boxes $o\,o$. Pinions $i\,i$ are like pinions $c\,c$, and gear with the master-wheel $a\,a$ in same manner. Inside pinions $n\,n$, on supplemental shafts H H, are like pinions $e\,e$ on main shaft B. These pinions $n\,n$ and $e\,e$ gear with each other, as shown.

Whatever power is applied to master-wheel $a\,a$ will be divided equally between pinions $c\,c$ and $i\,i$, and whatever is applied to pinions $i\,i$ will, through supplemental shafts H H, pinions $n\,n$ and $e\,e$, be made available for helping to turn main shaft B, so that main shaft B is turned by the united strength of the four pinions $c\,c$ and $i\,i$.

What I claim as my invention, and desire to secure by Letters Patent, is—

In combination, master-wheel $a$, pinions $c\,i$, shafts H B, and pinions $n\,e$, substantially as set forth.

WILLIAM W. DINGEE.

Witnesses:
EDGAR P. SAWYER,
WM. T. ELLSWORTH.